United States Patent [19]

Nicaise

[11] 4,104,188

[45] Aug. 1, 1978

[54] PRODUCTION OF ZINC POWDER FOR ELECTROCHEMICAL BATTERIES

[75] Inventor: Robert Nicaise, Neerpelt, Belgium

[73] Assignee: Metallurgie Hoboken-Overpelt, Brussels, Belgium

[21] Appl. No.: 709,070

[22] Filed: Jul. 27, 1976

Related U.S. Application Data

[63] Continuation of Ser. No. 499,346, Aug. 21, 1974, abandoned.

[51] Int. Cl.$^2$ .................. H01M 4/42; H01M 4/26
[52] U.S. Cl. .................. 252/182.1; 75/169; 75/178 R; 429/128; 429/230
[58] Field of Search .................. 252/182.1; 429/128, 429/230; 75/178 R, 169

[56] References Cited

U.S. PATENT DOCUMENTS

| | | | |
|---|---|---|---|
| 2,018,942 | 10/1935 | Brownston et al. | 429/166 |
| 3,565,695 | 2/1971 | Jerabek | 75/135 |
| 3,753,702 | 8/1973 | Radtke et al. | 75/178 R |

FOREIGN PATENT DOCUMENTS

| | | | |
|---|---|---|---|
| 4,803 | 12/1877 | United Kingdom | 75/178 R |

*Primary Examiner*—Benjamin R. Padgett
*Assistant Examiner*—Irwin Gluck
*Attorney, Agent, or Firm*—Fred Philpitt

[57] ABSTRACT

A process for the production of a zinc powder for electrochemical batteries which require the presence of mercury, in which at least part of the mercury required in the battery is introduced into molten zinc and the molten alloy is homogenized and transformed into powder by pulverization (atomization).

2 Claims, No Drawings

PRODUCTION OF ZINC POWDER FOR ELECTROCHEMICAL BATTERIES

This is a continuation of application Ser. No. 499,346, filed Aug. 21, 1974 now abandoned.

The present invention relates to a new process for the preparation of zinc powder intended for the manufacture of electrochemical batteries, the said zinc powder being for instance in the form of electrodes obtained by compression.

It is known that in the batteries comprising electrodes made of zinc powder, alloyed or not, when the battery does not deliver current a prejudicial escape of gas (hydrogen) occurs which reduces the electrical capacity available and creates problems, namely construction problems.

It is known to avoid such gaseous escape by the well known practice of amalgamating the powder. However, the amounts of mercury to be used in this process of the known art are relatively important and the amalgamation constitutes in itself an expensive and delicate operation. Moreover, this process has the drawback of a non-homogeneous distribution of the mercury.

The present invention avoids the above mentioned drawbacks.

The invention relates to a process for the manufacture of zinc powder for electrochemical batteries which require the presence of mercury, characterized in that all or part of the mercury required in the battery, is introduced into molten zinc, alloyed or not, said molten alloy being homogenized and transformed into powder by pulverization (atomization).

The powder obtained by the process of the invention is characterized in that the mercury contained in the powder forms an homogeneous alloy with the zinc. As a consequence, mercury will be available in each grain of powder in an equal and predetermined amount until complete exhaustion of the metal.

What I claim is:

1. A process for production of powdered electrode material for use in electrochemical batteries which use zinc powder and mercury as the electrode material, which process comprises
    (a) mixing molten zinc with an amount of mercury effective to inhibit gassing,
    (b) subjecting the molten mixture resulting from step (a) to a homogenizing treatment to obtain a homogenized molten alloy of zinc and mercury,
    (c) subjecting the homogenized molten alloy from step (b) to atomization to obtain a zinc-mercury alloy in powder form, each grain of said powder consisting of the same homogeneous zinc-mercury alloy.

2. Zinc powder for electrochemical batteries produced in accordance with the process of claim 1 in which each grain consists of the same homogeneous zinc-mercury alloy.

* * * * *